United States Patent
Li et al.

(10) Patent No.: US 8,937,447 B2
(45) Date of Patent: Jan. 20, 2015

(54) METHODS AND SYSTEMS FOR CONTROLLING A BOOST CONVERTER

(71) Applicant: GM Global Technology Operations LLC, Detroit, MI (US)

(72) Inventors: Lihua Li, Torrance, CA (US); Seok-Joo Jang, Irvine, CA (US); Ray M. Ransom, Big Bear City, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 13/687,767

(22) Filed: Nov. 28, 2012

(65) Prior Publication Data

US 2014/0145650 A1    May 29, 2014

(51) Int. Cl.
*H02P 29/02*    (2006.01)
*G05F 1/46*    (2006.01)
*G05F 5/00*    (2006.01)

(52) U.S. Cl.
CPC ............... *H02P 29/028* (2013.01); *G05F 1/46* (2013.01); *G05F 5/00* (2013.01)
USPC ............................... 318/434; 363/74; 323/234

(58) Field of Classification Search
USPC .......... 318/139, 434, 504; 363/59, 60, 61, 74, 363/89; 323/234, 299
See application file for complete search history.

(56) References Cited

U.S. PATENT DOCUMENTS

| | | | | |
|---|---|---|---|---|
| 6,178,104 B1 * | 1/2001 | Choi | ................ | 363/89 |
| 7,324,331 B2 * | 1/2008 | Fontana | ................ | 361/622 |
| 7,714,561 B2 * | 5/2010 | Ge et al. | ................ | 323/285 |
| 7,977,898 B2 | 7/2011 | Jang et al. | | |
| 8,283,900 B2 * | 10/2012 | Jang et al. | ................ | 323/222 |
| 2011/0109292 A1 | 5/2011 | Jang et al. | | |
| 2011/0199039 A1 * | 8/2011 | Lansberry | ................ | 318/625 |

\* cited by examiner

*Primary Examiner* — Bentsu Ro
(74) *Attorney, Agent, or Firm* — Ingrassia Fisher & Lorenz, P.C.

(57) ABSTRACT

Methods and apparatus are provided for controlling a boost converter. In one embodiment, the method includes processing an input current command through a plurality of prioritized limiting circuits to determine whether to limit the input current command and limiting the input current command to limit the boost converter when it is determined to limit the input current command. In one embodiment, the apparatus includes an energy source coupled to a boost converter that provides an output voltage responsive to a current command signal. An inverter is coupled to the boost converter to provide multiple phased currents to a multi-phase motor for a vehicle. A controller coupled to the boost converter for providing the current command signal by processing an input current command through a plurality of prioritized limiting circuits and determining whether to limit the input current command to provide the current command signal to the boost converter.

20 Claims, 4 Drawing Sheets

METHODS AND SYSTEMS FOR CONTROLLING A BOOST CONVERTER

TECHNICAL FIELD

The technical field generally relates to the operation and control of boost converters, and more particularly relates to the operation and control of direct current (DC) boost converters for a vehicle.

BACKGROUND

Electric, hybrid electric and fuel cell vehicles typically utilize a high voltage power distribution system to deliver high voltage to one or more electric drive motors and other electrical devices. The high voltage necessary for a vehicular drive motor is often on the order of 400 volts (V). In order to achieve these necessary high voltages, power distribution systems may implement a boost converter, also commonly referred to as a step-up converter. Such a boost converter permits the vehicle power sources (e.g., battery(ies) or a fuel cell) to store and deliver lower voltages than would be required without a boost converter.

When a boost converter operates in a current control mode, it tracks an input current command. However, in certain system circumstances (e.g., output battery voltage too high, output battery voltage too low or input fuel cell voltage too low), tracking the input current command risks system damage, particularly to the fuel cell in fuel cell implementations where stress may be applied to the upper cells in a fuel cell stack.

Accordingly, it is desirable to provide protection to a high voltage vehicle system incorporating a boost converter. In addition, it is desirable to provide a boost converter that may be employed in a fuel cell implementation that will protect the fuel cell from damage. Furthermore, other desirable features and characteristics of the present invention will become apparent from the subsequent detailed description and the appended claims, taken in conjunction with the accompanying drawings and the foregoing technical field and background.

SUMMARY

A method is provided for controlling a boost converter. In one embodiment, the method includes processing an input current command through a plurality of prioritized limiting circuits to determine whether to limit the input current command and limiting the input current command to limit the boost converter when it is determined to limit the input current command.

An apparatus is provided for controlling a boost converter. In one embodiment, the apparatus includes an energy source coupled to a boost converter that provides an output voltage responsive to a current command signal. An inverter is coupled to the boost converter to process the output voltage and provide multiple phased currents to a multi-phase motor for a vehicle. A controller is coupled to the boost converter for providing the current command signal by processing an input current command through a plurality of prioritized limiting circuits and determining whether to limit the input current command to provide the current command signal to the boost converter.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the subject matter of the disclosure or its uses. Furthermore, there is no intention to be bound by any expressed or implied theory presented in the preceding technical field, background, brief summary or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Finally, for the sake of brevity, conventional techniques and components related to vehicle electrical and mechanical parts and other functional aspects of the disclosure (and the individual operating components of the disclosure) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the disclosure.

Figure 1:
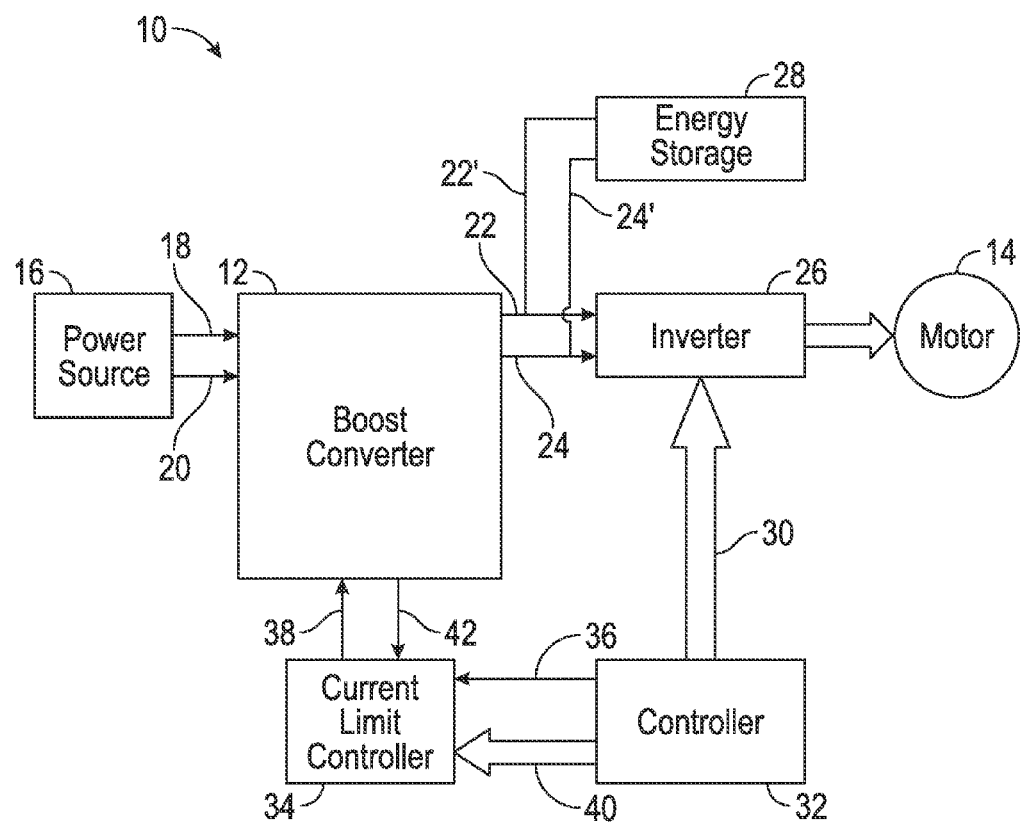
FIG. 1 is a block diagram of a high voltage motor system for a vehicle that incorporates a boost converter in accordance with an exemplary embodiment.

Referring to the drawings, wherein like reference numbers refer to like components, FIG. 1 an electric motor system 10 utilizing a boost converter 12 in accordance with exemplary embodiments is shown. The electric motor system 10 includes an electric motor 14 (for example, a three-phase electric motor) such as an induction machine or a permanent magnet electric motor, which operates to propel a vehicle in accordance with exemplary embodiments. To provide power to the electric motor 14, power from a power source 16 is provided by leads 18 and 20 to the boost converter 12. The boost converter 12 operates to boost the output voltage (and reduce the current due to conservation of energy) provided at leads 22 and 24 that couple the boost converter 12 to an inverter 26 (or other motor control circuit) and to an energy storage unit (e.g., battery) 28 via leads 22' and 24'. The energy storage unit 28 operates as energy buffer keeping the voltage at the input of the inverter 26 constant. The inverter 26 operates in a conventional manner in response to operational control signals 30 from a controller 32 to provide voltage to each phase or motor winding of the electric motor 14.

The controller 32 performs the computation and control functions of the electric motor system 10, and may comprise any type of processor or multiple processors, single integrated circuits such as a microprocessor, or any suitable number of integrated circuit devices and/or circuit boards working in cooperation to accomplish the functions of a processing unit. The controller 32 may include a memory that contains operational programs, instructions and/or variables or parameters useful for operating the electric motor system 10. Such memory could include various types of dynamic random access memory (DRAM) such as SDRAM, various types of static RAM (SRAM), and various types of non-volatile memory (PROM, EPROM, and flash).

According to exemplary embodiments, the electric motor system 10 also includes a current limit controller 34 that determines whether system conditions exist that warrant a modification or limiting of an input current command 36, that may be provided in some embodiments by the controller 32. That is, during normal operation, the input command current 36 may simply be passed along from the current limit controller 34 to the boost converter 12 as the boost converter current command signal 38. However, during system situations warranting a limiting condition, the current limit controller 34 limits the current command signal 38 provided to the boost converter 12 for the overall protection of the system. As will be discussed in more detail below, the current limit controller 34 includes a plurality of current limit circuits each of which provides a current limiting function to determine whether to limit the input current command 36 to provide the current command signal 38 to the boost converter 12. In performing these determinations, the current limit controller 34 processes other programmed parameters or variables provided via programming lines 40 from the controller 32 as well as feedback signals 42 from the boost converter 12

Figure 2:
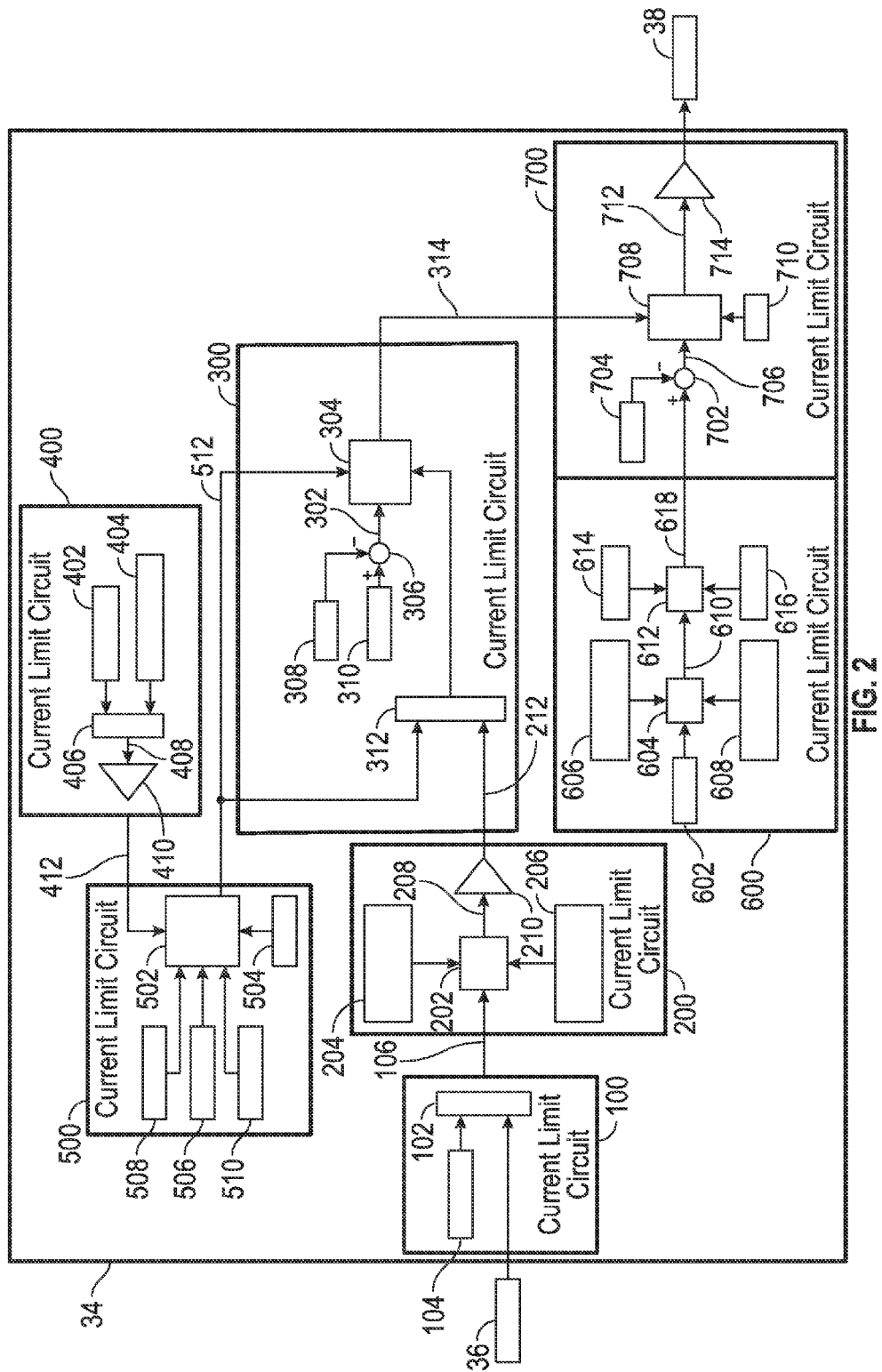
FIG. 2 is a block diagram of the current limiting controller of FIG. 1 in accordance with an exemplary embodiment.

Referring now to FIG. 2, a block diagram of the current limit controller 34 is shown as including seven current limit circuits 100, 200, 300, 400, 500, 600 and 700. It will be appreciated that more, fewer or other current limit circuits could be employed in any particular implementation of the current limit controller 34 and the current limit circuits discussed below represent but one of numerous exemplary embodiments contemplated by the present disclosure.

Maximum Output Power Limit (100)

The input current command 36 is initially processed by a first current limiting circuit 100, which determines whether to limit the input current command 36 to prevent the boost converter 12 from exceeding a maximum output power limit. To do this, the input current command is applied to a minimum select circuit 102, which selects between the minimum of the input current command 36 and another programmed value 104 (which may be provided by the controller 32 via programming lines 40), which in one embodiment is computed as: 1.03*Max_Power_Value/Source$_{(16)}$_Voltage. The input having the lesser or lower magnitude is provided as the output 106 of the first current limiting circuit 100, which becomes the input to a second current limiting circuit 200. In this way, the system 10 is protected by the boost converter 12 from exceeding the maximum output power limit.

Input Current Slew Rate Limit (200)

The second current limiting circuit 200 operates to determine whether to limit the input current command 36 to prevent the boost converter 12 from exceeding an input current slew rate limit (that is, from having the current provided by the boost converter 12 change (e.g., increase or decrease) too rapidly). To do this, the input 106 is applied to a limiter 202, which compares the input 106 to an upper limit 204 and a lower limit 206. If the input 106 is between the limits 204 and 206, the input 106 is passed to the output 208 of the limiter 202. Conversely, if the input 106 exceeds one of the limits 204 or 206, the exceeded limit value is passed to the output 208 of the limiter 202. In one embodiment, the upper limit 204 and the lower limit 206 represents preset variables that may be provided by the controller 32 via the programming lines 40 of FIG. 1. In other embodiments the upper limit 204 and the lower limit 206 may be programmed into the current limit controller by the vehicle manufacturer. In some embodiments, the upper limit 204 and the lower limit 206 are computed as: Limit 204=Source$_{(16)}$_Current_CMD+Source$_{(16)}$_Up_Limit; and Limit 206=Source$_{(16)}$_Current_CMD+Source$_{(16)}$_Down_Limit, which may be plus or minus 10 amps (A) per unit time depending upon the programmed limit values. Either the input 106 or one of the limits 204, 206 are provided as an output 208 of the limiter 202, which is amplified (via amplifier 210) and provided as the input 212 to another current limit circuit 300. However, since the current limit circuit 300 processes a variable provided by current limit circuit 500, which in turn processes a variable provided by current limit circuit 400, consideration of those circuits should precede discussion of the current limit circuit 300.

Maximum Input Current Limit (400)

Current limiting circuit 400 operates to determine whether to limit the input current command 36 to prevent the boost converter 12 from exceeding a maximum input current limit. To do this, a Source$_{(16)}$_Current Max value 402 (which may be provided by the controller 32 via the programming lines 40 of FIG. 1) is compared against the currently available current 404 from the power source 16 of FIG. 1 (which in some embodiments is realized as a fuel cell). These values are applied to a minimum select circuit 406, which provides the value having the lesser or lower magnitude as the output 408. This value is amplified (via amplifier 410) and provided as high voltage maximum current value 412.

Minimum Input Voltage Limit (500)

The current limit circuit 500 operates to determine whether to limit the input current command 36 to prevent the boost converter 12 from drawing too much current when the power source 16 of FIG. 1 is below a minimum input voltage limit. To do this, the current limit circuit 500 processes the high voltage maximum current value 412 (provided as the output of current limit circuit 400 as previously discussed) as the upper y-axis limit in a linear derating circuit 502 and the lower y-axis limit 504 is set to zero (an explanation of the operation of an exemplary linear derating circuit is provided in connection with FIGS. 3-4). The upper x-axis limit 506 and lower x-axis limit 508 are preset variables that may be provided by the controller 32 via programming lines 40 (FIG. 1). The measured voltage of the power source 16 (which may be provided by the feedback line 42 of FIG. 1) is used as the input 510 to the linear derating circuit 502, which provides an output 512.

Minimum Output Voltage Limit (300)

Current limiting circuit 300 operates to determine whether to boost or increase the input current command 36 to prevent the boost converter 12 from falling below a minimum output voltage limit. To do this, the current limit circuit 300 processes an error signal 302 in a proportional integrator 304. As will be appreciated, a proportional integrator processes an input signal (typically, an error signal) to provide the linear combination of the input signal and its integral. The error signal 302 is provided by subtracting (in substractor 306) the sensed voltage output 308 of the boost converter 12 (which may be provided by the feedback line 42 of FIG. 1) from a high voltage minimum command signal 310 (which may be provided by the controller 32 via programming lines 40). The output 314 of the proportional integrator 304 is limited between an upper limit and a lower limit. The upper limit is provided as the output 512 of the current limit circuit 500, while the lower limit of the proportional integrator 304 is selected as the minimum (via minimum select circuit 312) of the output 512 of the current limit circuit 500 (providing the minimum input voltage limit function) and the output 212 of the current limit circuit 200 (providing the input current slew rate limit function). The output 314 of the proportional integrator 304 becomes an input to the final current limit circuit 700 (providing a maximum output voltage limit function), which will be discussed below.

Output Voltage Slew Rate Limit (600)

The current limit circuit 600 operates to determine whether to limit the input current command 36 to prevent the boost converter 12 from exceeding an output voltage slew rate limit. To do this, a high voltage maximum command 602 (which may be provided by the controller 32 via programming lines 40 of FIG. 1) is applied to a limiter 604. The upper limit 606 and lower limit 608 are set at plus or minus 0.3V per unit time although other limits may be provided by the controller 32. The output 610 of the limiter 604 is applied to another limiter 612 that limits the output 618 between time invariant limits 614 and 616, which in some embodiments are computed as the sensed voltage output of the boost converter 12 (which may be provided by the feedback line 42 of FIG. 1) plus (for upper limit 614) and minus (for lower limit 616) an offset value. The output 618 of the current limit circuit 600 is also applied to the final (in the illustrated exemplary embodiment) current limit circuit 700. It will be appreciated that since the current limit circuit 700 has the last opportunity to limit the input current command 36, that the current limit circuit 700 has the highest priority of all the current limiting circuits. That is, the input current command is process substantially in the opposite order as the priority of importance for the limit function provided by the current limit circuits to be applied.

Maximum Output Voltage Limit (700)

The current limit circuit 700 operates to determine whether to limit the input current command 36 to prevent the boost converter 12 from exceeding a maximum output voltage limit. To do this, the output 618 from the current limiting circuit 600 has the sensed voltage output 704 of the boost converter 12 (which may be provided by the feedback line 42 of FIG. 1) subtracted (in substractor 702) from it and applied to a proportional integrator 708. The output 712 of the proportional integrator 708 is limited between an upper limit provided as the output 314 of the current limit circuit 300 (providing the function of minimum output voltage limit) and a lower limit 710 set to a zero value in the illustrated embodiment. The output 712 is amplified (in amplifier 714) and provided as the current command signal 38 to the boost converter 12 of FIG. 1.

Accordingly, the current limit controller 34 applies a plurality (seven in the illustrated exemplary embodiment) of current limit circuits that apply any current limit functions deemed desirable or necessary for any particular embodiment. The arrangement and processing of the input current command by the plurality of current limit circuits provides a natural priority to the functions. In the illustrated embodiment, the priority of functions and plurality of current limiting circuits are listed in Table 1 below:

TABLE 1

| Priority | Function | Current Limiting Circuit |
|---|---|---|
| Highest | Maximum Output Voltage | 700 |
|  | Output Voltage Slew Rate | 600 |
|  | Minimum Input Voltage | 500 |
|  | Maximum Input Current | 400 |
|  | Minimum Output Voltage | 300 |
|  | Input Current Slew Rate | 200 |
| Lowest | Maximum Output Power | 100 |

Figure 3:
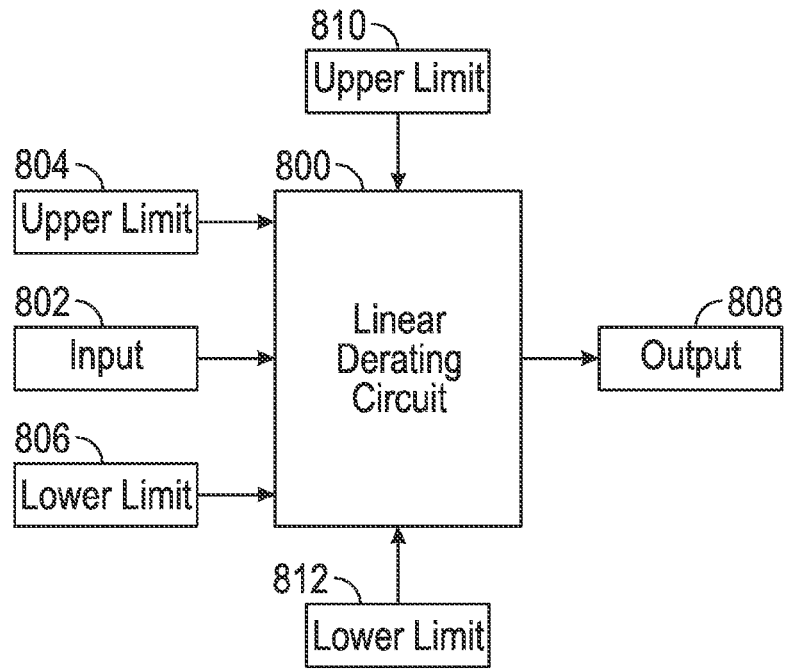
FIG. 3 is a block diagram of an exemplary linear derating circuit in accordance with an exemplary embodiment.
Figure 4:
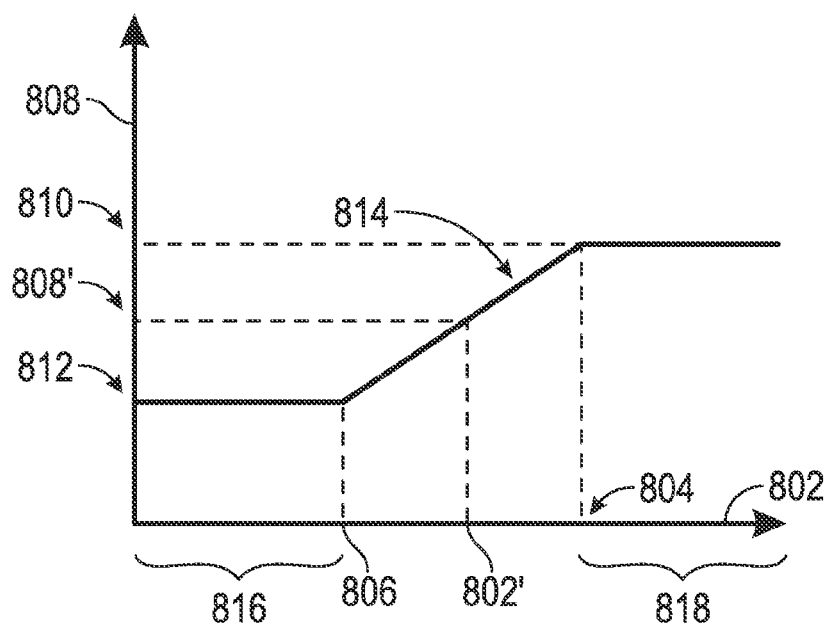
FIG. 4 is a chart illustrating the operation of the linear derating circuit of FIG. 3 in accordance with an exemplary embodiment.

Referring now to FIG. 3 and FIG. 4, the exemplary operation of a linear derating circuit 800 is explained. A linear derating circuit 800 is illustrated as receiving an input 802 and providing an output 808. The input 802 is modeled as the x-axis value that is applied to the linear derating circuit 800 and the output 808 is modeled as the y-axis value provided by the linear derating circuit 800. A linear derating region 814 is bounded by an upper limit 804 and a lower limit 806 along the x-axis, and along the y-axis by an upper limit 810 and a lower limit 812. As an example, input 802' has a value within the linear derating region 814, which produces the corresponding output 808' that is derated by the slope employed by the linear derating circuit 800 in the linear derating region 814. Any input 802 value in the region indicated as 816, is limited to the lower y-axis limit 812 and any input 802 value in the region indicated as 818, is limited to the upper y-axis limit 810. In this way, input values can be derated within controlled limits that are provided to the linear derating circuit 800.

Figure 5:
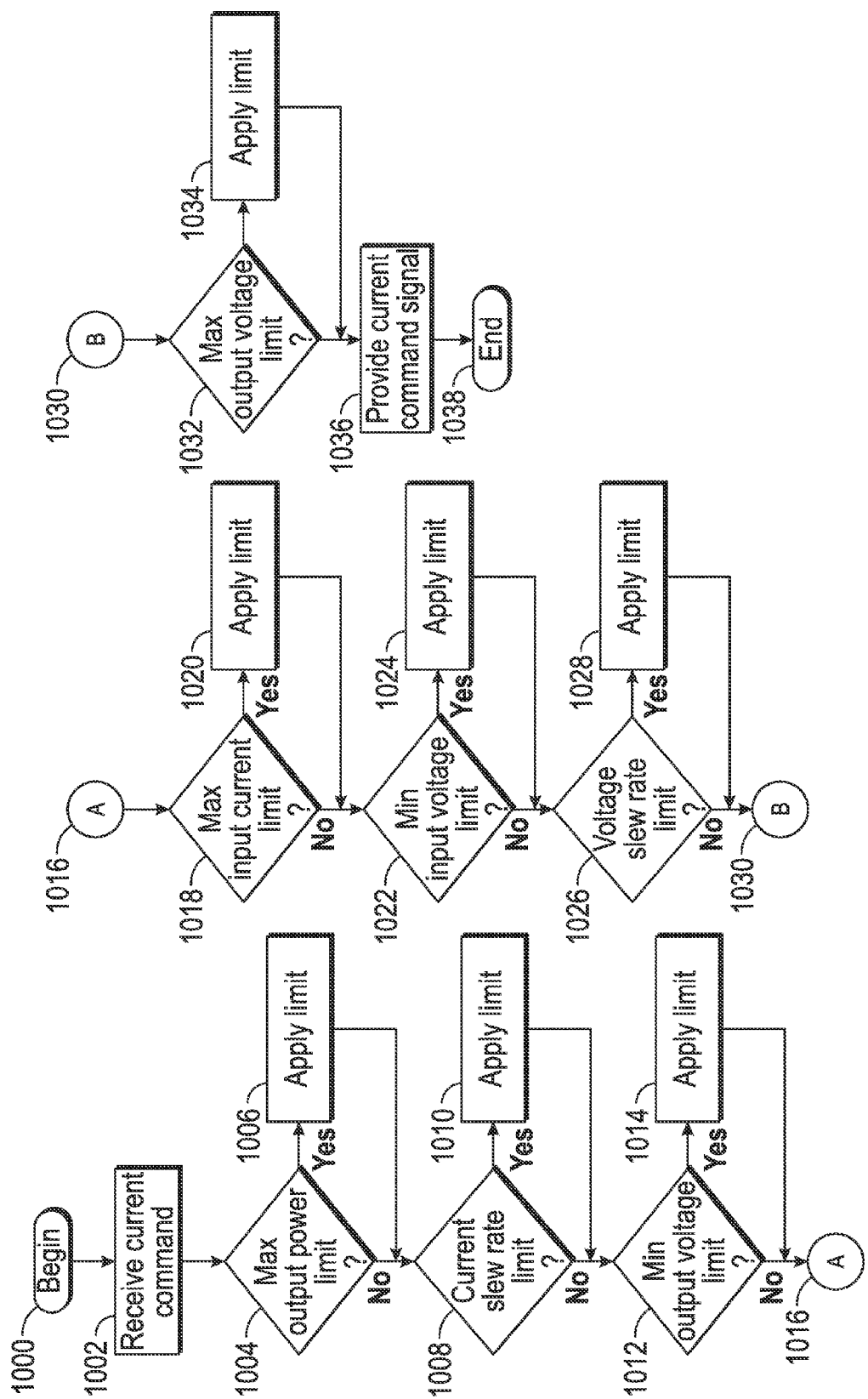
FIG. 5 is a flow diagram illustrating an exemplary method for operating a boost converter in accordance with an exemplary embodiment.

Referring now to FIG. 5, a flow diagram of a method 1000 useful for controlling the operation of a boost converter (12 of FIG. 1) is shown. The various tasks performed in connection with the method 1000 of FIG. 5 may be performed by hardware, a processing apparatus executing software or firmware, or any combination thereof. For illustrative purposes, the following description of the method of FIG. 5 may refer to elements mentioned above in connection with FIGS. 1-4. In practice, portions of the method of FIG. 5 may be performed by different elements of the described system. It should also be appreciated that the method of FIG. 5 may include any number of additional or alternative tasks and that the method of FIG. 5 may be incorporated into a more comprehensive procedure or process having additional functionality not described in detail herein. Moreover, one or more of the tasks shown in FIG. 5 could be omitted from an embodiment of the method of FIG. 5 as long as the intended overall functionality remains intact.

The routine begins in step 1002 which receives the input current command 36 (FIG. 2). Next, decision 1004 determines whether to apply a maximum output power limit function (current limiting circuit 100 of FIG. 2). A negative determination proceeds to decision 1008, while an affirmative determination applies the limit (step 1006) before proceeding to decision 1008.

Decision 1008 determines whether to apply an input current slew rate limit function (current limiting circuit 200 of FIG. 2). A negative determination proceeds to decision 1012, while an affirmative determination applies the limit (step 1010) before proceeding to decision 1012.

Decision 1012 determines whether to apply a minimum output voltage limit function (current limiting circuit 300 of FIG. 2). A negative determination proceeds to decision 1018 (via connection 1016), while an affirmative determination applies the limit (step 1014) before proceeding to decision 1018.

Decision 1018 determines whether to apply a maximum input current limit function (current limiting circuit 400 of FIG. 2). A negative determination proceeds to decision 1022, while an affirmative determination applies the limit (step 1020) before proceeding to decision 1022.

Decision 1022 determines whether to apply a minimum input voltage limit function (current limiting circuit 500 of FIG. 2). A negative determination proceeds to decision 1026, while an affirmative determination applies the limit (step 1024) before proceeding to decision 1026.

Decision 1026 determines whether to apply an output voltage slew rate limit function (current limiting circuit 600 of FIG. 2). A negative determination proceeds to decision 1032 (via connection 1030), while an affirmative determination applies the limit (step 1028) before proceeding to decision 532.

Decision 1032 determines whether to apply a maximum output voltage limit function (current limiting circuit 700 of FIG. 2). An affirmative determination applies the limit (step 1034) and then the current command signal 38 (FIG. 2) is provided in step 1036. The routine may then end (step 1038) or loop back to begin again with step 1002.

Accordingly, method and systems for controlling a boost converter are provided for use in a vehicle. Use of the current limit controller 34 to selectively limit an input current command provides a current command signal in accordance with a priority arrangement of current limit functions provided by a plurality of current limiting circuits. The number and type of current limit functions (circuits) may vary depending upon any particular implementation, but afford system protection by preventing the boost converter from exceeding various limits that may risk damage to the system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a boost converter to produce an output voltage from an input voltage responsive to a current command signal, comprising the steps of:
    processing an input current command via a plurality of limiting functions to determine whether to limit the input current command; and
    limiting the input current command to provide the current command signal to the boost converter when it is determined to limit the input current command.

2. The method of claim 1, wherein the plurality of limiting functions are selected from the following group of limiting functions: maximum output voltage; output voltage slew rate; minimum input voltage; maximum input current; minimum output voltage; input current slew rate; maximum output power.

3. The method of claim 1, wherein each of the plurality of limiting functions have a priority order of determining whether to limit the input current command.

4. The method of claim 3, wherein the priority order (from highest priority to lowest priority) comprises: maximum output voltage; output voltage slew rate; minimum input voltage; maximum input current; minimum output voltage; input current slew rate; and maximum output power.

5. A method for controlling a boost converter to produce an output voltage from an input voltage responsive to a current command signal, comprising the steps of:
    processing an input current command through a plurality of prioritized limiting circuits to determine whether to limit the input current command; and
    limiting the input current command to provide the current command signal to the boost converter when it is determined to limit the input current command.

6. The method of claim 5, wherein processing the input current command comprises processing the input current command with at least a limiting circuit providing a maximum output power limit function.

7. The method of claim 5, wherein processing the input current command comprises processing the input current command with at least a limiting circuit providing a input current slew rate limit function.

8. The method of claim 5, wherein processing the input current command comprises processing the input current command with at least a limiting circuit providing a minimum output voltage limit function.

9. The method of claim 5, wherein processing the input current command comprises processing the input current command with at least a limiting circuit providing a maximum input current limit function.

10. The method of claim 5, wherein processing the input current command comprises processing the input current command with at least a limiting circuit providing a minimum input voltage limit function.

11. The method of claim 5, wherein processing the input current command comprises processing the input current command with at least a limiting circuit providing a maximum output voltage limit function.

12. The method of claim 5, wherein processing the input current command comprises processing the input current command with at least a limiting circuit providing a output voltage slew rate limit function.

13. The method of claim 5, wherein the plurality of limiting circuits are selected to provide one of the following group of limiting functions: maximum output voltage; output voltage slew rate; minimum input voltage; maximum input current; minimum output voltage; input current slew rate; maximum output power.

14. The method of claim 13, wherein the limiting functions have a priority order (from highest priority to lowest priority) comprising: maximum output voltage; output voltage slew rate; minimum input voltage; maximum input current; minimum output voltage; input current slew rate; and maximum output power.

15. A system, comprising:
    an energy source;
    a boost converter coupled to the energy source and providing an output voltage responsive to a current command signal;
    an inverter coupled to the boost converter to process the output voltage and provide multiple phased currents to a multi-phase motor for a vehicle;
    a controller coupled to the boost converter for providing the current command signal by processing an input current command through a plurality of prioritized limiting circuits and determining whether to limit the input current command to provide the current command signal to the boost converter.

16. The system of claim 15, wherein the plurality of prioritized limiting circuits are selected from limiting circuit providing one of the following group of limiting functions: maximum output voltage; output voltage slew rate; minimum input voltage; maximum input current; minimum output voltage; input current slew rate; maximum output power.

17. The system of claim 16, wherein the prioritized limiting functions have a priority order (from highest priority to lowest priority) comprising: maximum output voltage; output voltage slew rate; minimum input voltage; maximum input current; minimum output voltage; input current slew rate; and maximum output power.

18. The system of claim 17, wherein the prioritized limiting circuits process the input current command in the order opposite the priority order.

19. The system of claim 15, wherein the energy source comprises a fuel cell.

20. The system of claim 19, wherein the prioritized limiting circuits limit the current command of the boost converter to protect the fuel cell.

* * * * *